UNITED STATES PATENT OFFICE.

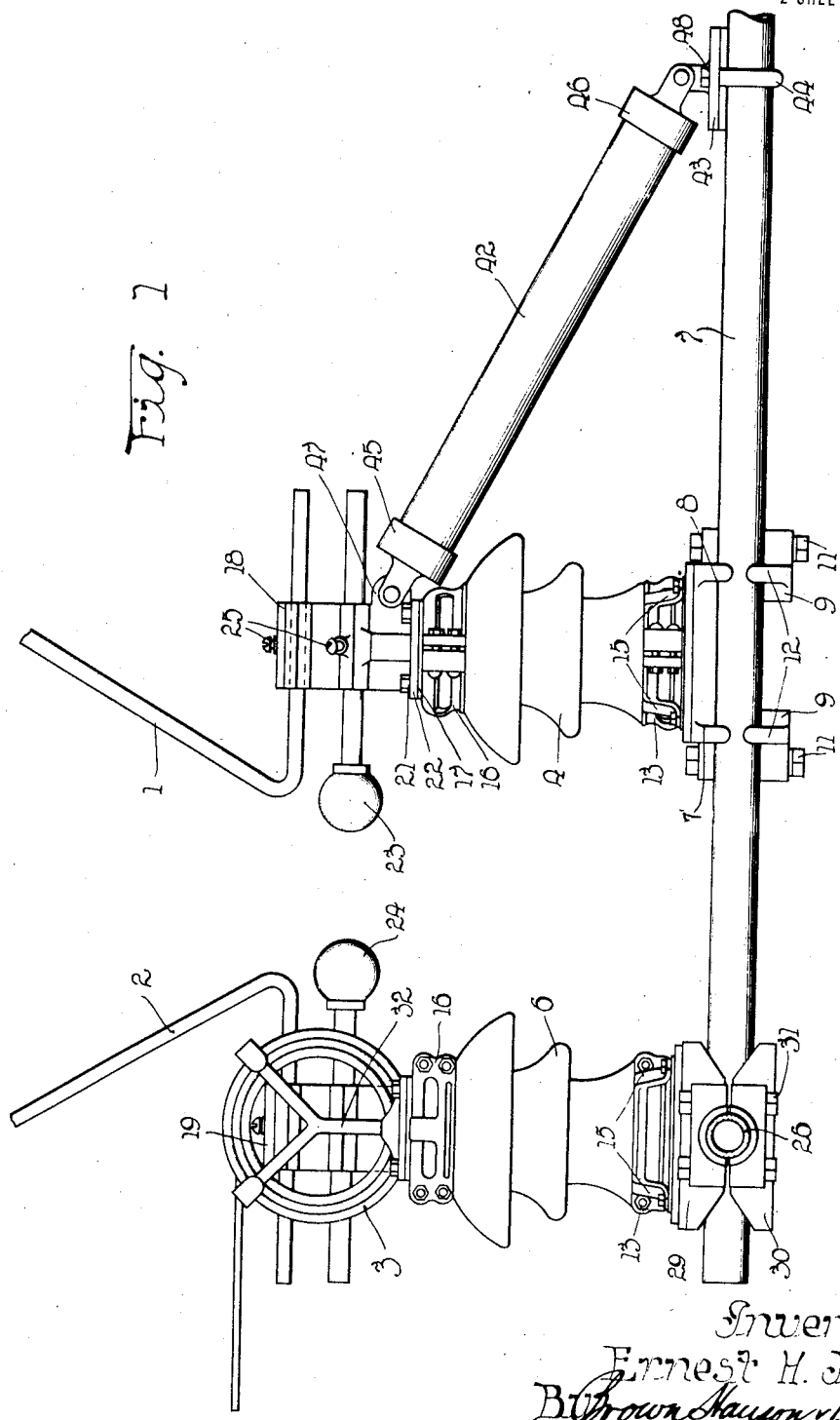

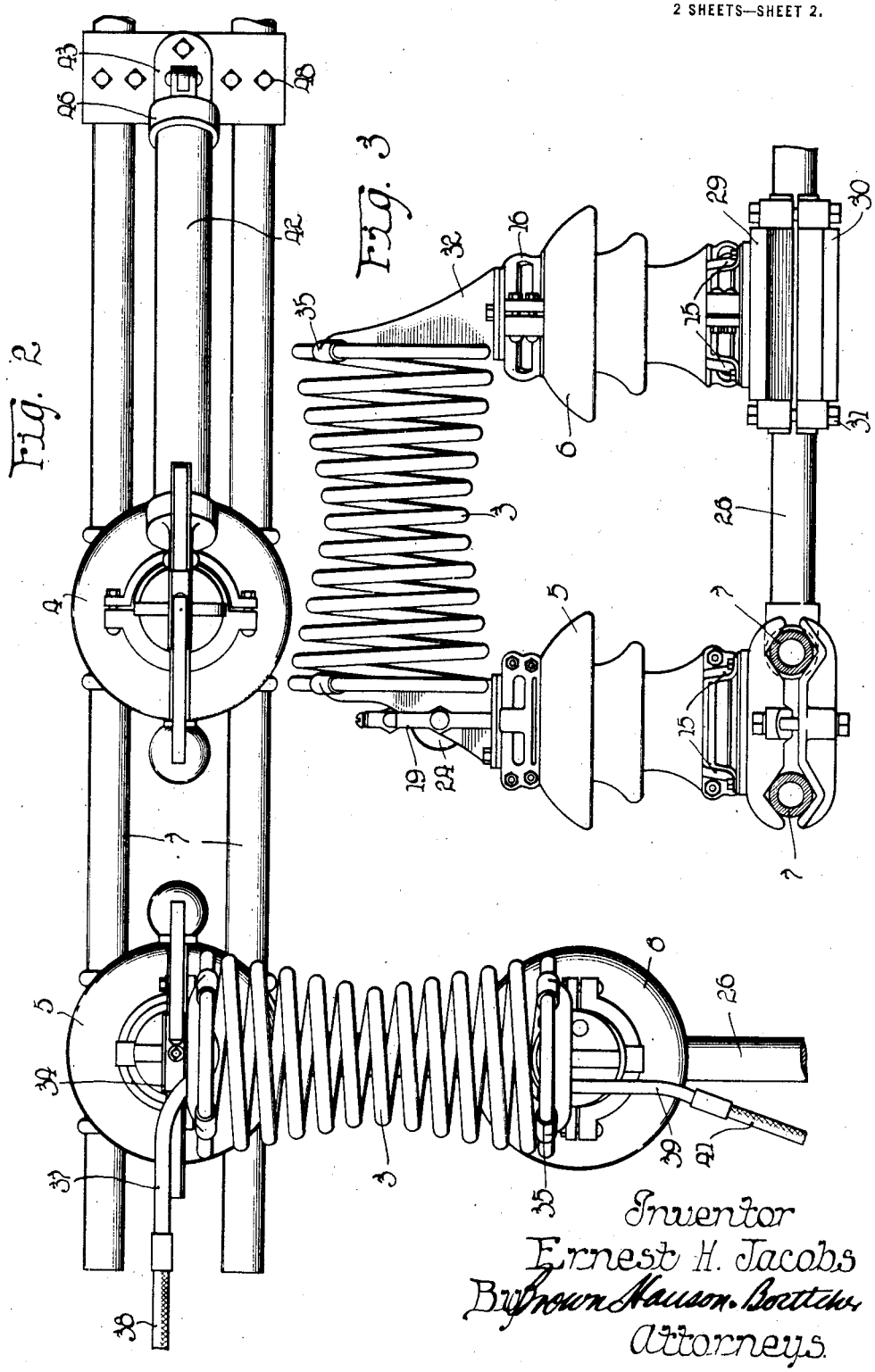

ERNEST H. JACOBS, OF CHICAGO, ILLINOIS, ASSIGNOR TO ELECTRICAL ENGINEERS' EQUIPMENT COMPANY, OF CHICAGO, ILLINOIS, A CORPORATION OF ILLINOIS.

LIGHTNING-ARRESTER AND MOUNTING.

1,356,720.     Specification of Letters Patent.     Patented Oct. 26, 1920.

Application filed June 17, 1918. Serial No. 240,278.

*To all whom it may concern:*

Be it known that I, ERNEST H. JACOBS, a citizen of the United States, residing at Chicago, in the county of Cook and State of Illinois, have invented a certain new and useful Improvement in Lightning-Arresters and Mountings, of which the following is a full, clear, concise, and exact description, reference being had to the accompanying drawings, forming a part of this specification.

My invention relates to lightning arresters and mountings thereof.

It is well known that transmission lines and the apparatus connected thereto is subject to damage caused by peculiar conditions of potential. Abnormal potential conditions of a destructive or damaging character are all included in the general term of "lightning," although atmospheric electricity known specifically as lightning is only one of a number of causes.

It is advisable to give relief to these abnormal pressures with the least hindrance and in the most direct manner possible. The apparatus employed for affording such relief is generally termed a lightning arrester. The lightning arrester usually comprises an electrode connected to the line and another electrode connected to ground and separated by a gap from the line electrode. It has been found that the action of "lightning" is erratic and no general setting of the gap will insure that the abnormal potential will always pass to ground. If the gap is set with the electrodes too far apart the lightning will pass by the arrester and may cause damage elsewhere along the line on the connected apparatus. If the gap is set with the electrodes too near, there may be a very heavy flow of dynamic current to follow in case the gap breaks down, which flow of current may cause serious disturbance some times as bad as the original disturbance.

The generally accepted solution has been the employment of inductance or choke coils in the line for limiting the travel of the disturbing potential. The gap of the arrester is connected on the line side of the coil so that lightning coming along the line toward the station will be stopped by the coil. The disturbing potential tends to "pile up" at this point and can readily be caused to jump the gap of the arrester.

I have found that it is advisable to give the lightning as direct a run as possible because of the apparent inertia of movement which it seems to possess. To this end I place the arrester gap in direct line with the line wire and connect the inductance or choke coil at right angles thereto. This aids very materially in giving direct and positive relief.

I further provide a resistance in series with the grounded electrode for limiting the dynamic current when the gap breaks down. This resistance is also connected in substantially a straight run to ground with no sharp turns and as direct a path as possible.

A further provision of my invention is the employment of a compound spark gap, comprising a pair of horn electrodes and a pair of sphere electrodes independently mounted on the arrester frame or insulators. A further feature of the invention is the manner of mounting the choke coil and arrester upon suitable insulators and in the connecting or supporting frame for the parts. The mounting is designed to permit relative adjustment of the insulators supporting the discharge gap and of the insulators supporting the choke coil. The insulators, clamps and other parts are universal and interchangeable so that the arrester may be erected and dismantled with facility and so that the arrester may be asembled out of standard parts for any installation. For example, the voltage capacity of the arrester may be readily changed to meet the requirements of an installation by merely substituting different size insulators in the standard clamps, and likewise choke coils of different lengths may be readily substituted to comply with installations of different frequencies by merely adjusting the mounting.

I have further provided for protecting the horn gap electrodes so that they may be set at a substantially shorter distance apart, consequently minimizing the possibility of the lightning passing by the arrester and causing damage elsewhere along the line.

In the accompanying drawings I have illustrated one preferred embodiment of my invention to inform those skilled in the art how to practice and use the same.

Figure 1 is a side elevational view of my improved lightning arrester;

Fig. 2 is a plan view of the same; and

Fig. 3 is an end elevation of the arrester.

The entire fitting, consisting of the horn gap, electrodes 1 and 2 and the choke coil 3, is mounted upon the three insulators 4, 5 and 6. It will be noted from Fig. 2 that the insulator 5 is situated at the "corner" of the fitting, the horn gap lightning arrester and the choke coil extending away therefrom at right angles to each other. This insulator and the insulator 4 are supported on base plates 7' which rest upon the main frame formed by the two parallel pipes 7—7. These pipes may comprise a large frame structure for supporting a number of electrical fittings, or they may form an independent frame for this particular fitting, as the installation requires.

The base plates 7' seat astride the pipes 7 and have integral guiding claws 8 extending down and partly embracing the pipes 7. A crab 9 is slung beneath the pipes 7 at each end of the base 7' by bolts 11 which extend through projecting ears on the base 7' and through bosses formed on each of the crabs. These crabs also have integral guiding claws 12 which prevent the crabs from swinging out from under the pipes 7. It will be apparent that by loosening the bolts 11 the base plate 7' may be shifted along the pipe frame 7 to obtain any desired spacing between the insulators 4 and 5.

Each of the insulators 4, 5 and 6 is secured to its base plate by an insulator clamp 13. The three insulators are units of a standardized "system" of electrical fittings. Each of the insulators has its head portion and lower petticoat annularly grooved to form a circumferential bead of standard size so that standardized clamps may be applied to both ends of the insulator. The lower clamp 13 comprises two semi-circular bands, which are clamped over the insulator bead by bolts extending through lugs projecting from the ends of the bands as shown. The clamp is attached to the base plate 6 by bolts extending through feet 15 formed integral with the bands. This type of clamp is fully disclosed in my co-pending application Serial Number 244,830 filed July 15, 1918.

The clamp 16 on the head end of the insulator is similar to the clamp 13 with the exception that the feet 15 are omitted and a socket plate 17 is formed integral with one of the semi-circular clamping bands. Standards 18 and 19 are secured to these socket plates upon the insulators 4 and 5, by bolts 21 passing through the base 22 of each standard and threading into holes in the socket plate 17. The diverging horn gap electrodes 1 and 2 and the spherical high speed electrodes 23 and 24 are slidably mounted in holes in these standards, being retained at any adjusted position by the set screws 25.

The third insulator 6 is supported upon a singe pipe 26, extending substantially at right angles to the main pipe frame 7. The base plate 7', of the corner insulator 5 is cut away to clear the T connection 27 which joins the pipe 26 to the pipe 7. This T connection is preferably pinned to the pipe 7. A pair of yoke shaped members 29 and 30 embrace the pipe 26 and are arranged to be clamped at any desired position along the pipe by bolts 31 interconnecting the two. A standard insulator clamp 13 is employed for mounting the insulator 6 upon the yoke member 29.

The upper insulator clamp 16, on the insulator 6, supports a choke coil bracket 32, preferably of the general form disclosed in my co-pending application, Serial No. 231548 filed April 29, 1918. This bracket has a pair of diverging arms, as clearly shown in Fig. 1, to the ends of which are attached clamping devices which engage over the end turn of the choke coil 3. At the other end of the choke coil, the end turn is supported by similar clamping devices attached to diverging arms 34, formed integral with the standard 19. These clamping devices are capable of clamping to different gage wire. They consist of a clip member 35 having a recessed face coöperating with a recess in the arm 34 between which the choke coil wire is clamped by a screw bolt passing through the arm 34 and clip 35. When it is desired to substitute a choke coil of different length the yoke members 29 and 30 are shifted along the pipe 26.

The end 37 of the choke coil winding is bent laterally to make connection with the line wire 38 which leads up to the fitting on a line substantially parallel to the pipe frame 7, as shown in Fig. 2. The other end 39 of the choke coil is connected to the lead or bus 41, which leads to the circuit breaker or transformer.

From the foregoing it will be apparent that the electrodes 2 and 24 are at all times subject to the line potential. The electrodes 1 and 23 are always at ground potential through the following connection between the standard 18 and pipe frame 7. A high resistance rod 42, composed principally of graphite and clay, is supported obliquely between the standard 18 and a plate 43 attached to the pipe frame 7 by the U-bolts 44. Connection is made to the ends of the rod 42 through ferrules 45 and 46, the upper ferrule 45 being bolted to a lug 47 extending from the standard 18 and the lower ferrule 46 being bolted to a lug 48 extending up from the grounding plate 43.

The impedance that is offered by the choke coil to current flow of normal frequency and normal potential is negligible. However, a disturbance arising on the line, having a steep wave front or high frequency will meet such an impedance in the choke coil that it will discharge across the gap rather than pass through the high impedance of the coil. The impedance offered by the choke coil against the disturbance discharging therethrough is further increased by disposing the choke coil at a sharp angle to the incoming line. A surge of steep wave front or high potential has a relatively large inertia and this inertia will tend to carry the disturbance directly across the horn gap rather than turn abruptly to flow through the choke coil.

I have found that upon setting the horn gap electrodes so that the abnormal potential will discharge thereacross these electrodes are constantly subject to damage. If in order to protect these electrodes the gap therebetween is lengthened the abnormal potential may pass by the arrester and cause damage elsewhere.

By the employment of a compound spark gap, the voltage capacity of the arrester remaining the same, the gap may be set with the electrodes considerably nearer than if the sphere electrodes were not employed. This is due to the fact, that as the gap between the sphere electrodes is less than the gap between the horn electrodes, the initial discharge will be across the sphere gap, these electrodes not being subject to damage by the discharge of abnormal potential thereacross as they do not need to break the arc.

As the disturbance is relieved across the sphere gap, the natural tendency of the arc to rise, due to its heat, will result in its being blown upwardly until it is transferred to the horn gap electrodes 1 and 2. The arc will then travel up along the horn gap electrodes 1 and 2 until it finally breaks, due to the increase in resistance, which becomes so great as to make the arc unstable. Thus the sphere gap forms a protective shield for the horn gap permitting a quicker discharge across less air space thereby facilitating relief without endangering the horngaps.

The high resistance rod 42 provides a relatively straight and direct connection to ground. The resistance of the rod will not offer any serious hindrance to the passage of lightning to ground but it will limit the flow of dynamic current to a safe value. Even if the resistance rod should become broken and the ends drop down there would still be the resistance of the gap caused by the break in the rod 42. Thus under no condition can short circuiting of the resistance occur by breakage of the rod. This is a feature of importance.

I do not intend to be limited to the particular details herein shown and described.

I claim:

1. In combination a grounded frame, a pair of insulators on the said frame, a pair of horngap electrodes on the said insulators, a relatively long straight incoming line wire leading directly to one of the said electrodes, a high resistance rod extending from the other electrode, said rod connecting the said other electrode to the grounded frame, the electrode, rod, and line wire being disposed substantially in a line, and an out-going line wire leading from the first named electrode and electrically connected to the incoming line wire, said out-going line wire extending at an abrupt angle to the incoming line wire.

2. In a lightning arrester and choke coil unit, a supporting frame comprising two frame members extending substantially at right angles to each other, a pair of insulators supported on one of said frame members, a pair of electrodes on said insulators, a third insulator supported on said other frame member, and a choke coil supported between said third insulator and one of said pair of insulators.

3. In a lightning arrester and choke coil unit, a supporting frame comprising two frame members extending substantially at right angles to each other, a pair of base members adjustable along one of said frame members, insulators supported on said base members, lightning arrester electrodes on said insulators, a base member adjustable along the other of said frame members, an insulator supported on said latter base member, and a choke coil supported between said latter insulator and one of said first insulators.

4. In a lightning arrester, a main supporting frame, a secondary supporting frame extending substantially at right angles to said main frame, a pair of base members adjustably mounted on said main frame, a base member adjustably mounted on said secondary frame, clamps attached to said base members, insulators engaging in said clamps, clamps on the upper ends of said insulators, a pair of horn gap electrodes mounted on said main frame insulators, and a choke coil supported between one of said main frame insulators and said secondary frame insulator.

5. In a lightning arrester, a relatively long and substantially straight transmission wire, a discharge gap electrode directly connected to said transmission wire, an opposing discharge gap electrode, said electrodes being disposed substantially in line with said transmission wire, a choke coil connected to said transmission wire, the axes of said choke coil being disposed at a considerable angle to said transmission wire, insulators for supporting said discharge gap and said choke coil, and means for relatively adjusting said insulators.

6. In combination a grounded frame, three insulators arranged to form a right angled triangle mounted on the said frame, opposing horngap electrodes carried by the two adjacent of the said insulators, a choke coil carried by the intermediate insulator and the third insulator, a substantially straight line wire leading directly to the intermediate insulator, a resistance rod carried by the other said adjacent insulator, extending therefrom to the grounded frame, and disposed at a slight angle to the line of the said line wire, and an out-going line wire connected to the other end of said choke coil.

7. In combination with a grounded main supporting frame, a pair of insulators on the said frame, a pair of opposed horngap electrodes on the said insulators, a relatively straight incoming line wire, substantially in line with both electrodes, extending to one electrode, a resistance rod extending from the other electrode and disposed at a slight angle to the said line wire electrically connecting the said frame to the said electrodes, a secondary frame, a third insulator on said frame, and a choke coil carried by and between the third insulator and the first electrode, the axis of the said coil being disposed at a considerable angle to the said line wire.

8. In combination, a grounded frame, a pair of insulators on the said frame, standards mounted on the said insulators, a horngap electrode carried by each of the said standards, a pair of spherical electrodes carried by the said standards in a parallel plane but below the first named likewise electrodes, and a line wire extending to one of the said standards, a resistance rod extending from the other standard to the grounded frame, and means to adjust the distance between the said pair of standards and independent means to adjust the distance between the second pair of electrodes.

9. In combination, an insulator, a clamp for the top of the insulator, a bracket mounted on said clamp, said bracket having a pair of transverse openings for clamping a pair of rods in substantially parallel relation, the upper one of said rods being bent upwardly to form a horn electrode, the lower rod having a spherical knob forming a sphere electrode projecting outwardly slightly beyond the horn electrode, means for clamping said rods in fixed position on said brackets, and a second insulator having a spherical member coöperating with said sphere electrode and a rod extending above the spherical member to coöperate with the horn electrode to form a shorter sphere gap directly below the horn gap.

10. In combination, an insulator, a clamp for the top of the insulator, a bracket mounted on said clamp, said bracket having a pair of transverse sockets for clamping a pair of rods in parallel relation, the upper one of said rods being bent upwardly to form a horn electrode, the lower rod having a spherical knob forming a sphere electrode projecting outwardly slightly beyond the horn electrode, means for clamping said rods in fixed position on said bracket, a second insulator having a clamp, a bracket mounted on said second clamp, said second bracket having a pair of transverse sockets for clamping a pair of rods in parallel relation, the upper one of said second pair of rods being bent upwardly to form a horn electrode in line with the first horn electrode, said horn electrodes forming a horn gap between them, the other of said second pair of rods having a spherical knob forming a sphere electrode projecting slightly beyond the second horn electrode and in line with the first sphere electrode to form a sphere gap of less length than the horn gap, a grounded frame for supporting said insulators and a resistance rod connected between one of said brackets and the grounded frame.

11. In combination, a pair of insulators, upwardly extending metal brackets clamped on the heads of said insulators, each bracket having a pair of transverse openings one above the other, the lower opening in each case having a rod with a spherical metal knob at the inner end, means for clamping these rods adjustably to form a sphere gap between the knobs, rods in the upper openings, said latter rods being formed into horns to form between them a horn gap directly above and slightly greater than the sphere gap and means for clamping the latter rods in the brackets.

12. In combination, a pair of insulators, upwardly extending metal brackets clamped on the heads of said insulators, each bracket having a pair of transverse openings one above the other, the lower opening in each case having a rod with a spherical metal knob at the inner end, means for clamping these rods adjustably to form a sphere gap between the knobs, rods in the upper openings, said latter rods being formed into horns to form between them a horn gap directly above and slightly greater than the sphere gap, means for clamping the latter rods in the brackets, one of said brackets having a plurality of arms extending laterally to support the end of an inductance coil connected to said one bracket.

13. In combination, a pair of insulators, upwardly extending metal brackets clamped on the heads of said insulators, each bracket having a pair of transverse openings one above the other, the lower opening in each case having a rod with a spherical metal knob at the inner end, means for clamping these rods adjustably to form a sphere gap between the knobs, rods in the upper openings, said latter rods being formed into horns to form between them a horn gap directly above and slightly greater than the sphere gap, means for clamping the latter rods in the brackets, a metallic grounded support for the insulators, and a resistance rod connected at its upper end to one of the brackets and at its lower end to the grounded support and extending diagonally down over the adjacent insulator to said support.

14. In combination, a pair of mounting pipes supported in substantially parallel arrangement, two pairs of clamps, each pair comprising an upper plate and lower fastening means, said upper plate being notched to hold the pipes securely, insulators for the clamps, a split insulator clamp embracing the bottom of each insulator and secured to the plate of each clamp to seat each insulator with its bottom part upon the corresponding plate, clamps for the heads of the insulators, brackets mounted on said clamps, each bracket having clamping sockets, a rod bearing a sphere electrode, and a rod bent into horn formation to provide a horn electrode, said rods being adjustable in the sockets for minor adjustments of the gaps between the electrodes and said clamps being adjustable for major adjustment of the gaps.

15. In combination, a pair of mounting pipes supported in substantially parallel arrangement, two pairs of clamps, each pair comprising an upper plate and lower fastening means, said upper plate being notched to hold the pipes securely, insulators for the clamps, a split insulator clamp embracing the bottom of each insulator and secured to the plate of each clamp to seat each insulator with its bottom part upon the corresponding plate, clamps for the heads of the insulators, brackets mounted on said clamps, each bracket having clamping sockets, a rod bearing a sphere electrode, a rod bent into horn formation to provide a horn electrode, said rods being adjustable in the sockets for minor adjustments of the gaps between the electrodes and said clamps being adjustable for major adjustment of the gaps, a ground piece clamped to said pipes, and a diagonal resistance rod having a clamping member at each end, said resistance rod being clamped at its upper end to one of the brackets and at its lower end to said ground piece.

16. In combination, a pair of mounting pipes supported in substantially parallel relation, a pipe member extending laterally from one of said pair of pipes, a pair of clamps on said parallel pipes, each clamp comprising an upper plate and a lower clamping means, one of said clamps being mounted substantially at the junction of the pipe member to one of said pair of pipes, insulators for the clamps, a split insulator clamp embracing the bottom part of each insulator and secured upon the clamping plate of each clamp to seat the bottom of the insulator substantially flat upon the clamping plate, clamps for the heads of the insulators, brackets mounted on said clamps, each bracket having clamping sockets, a rod bearing a sphere electrode, a rod bent into horn formation to provide a horn electrode, said rods being adjustable in the sockets for minor adjustments of the gaps between the electrodes and said clamps being adjustable for major adjustments between the electrodes, the bracket of the insulator mounted at the junction of said laterally extending pipe member and one of the pair of pipes having means for supporting the end of an inductance coil, a clamping member mounted on said laterally extending pipe member, an insulator secured on said latter clamp, a bracket clamped on the top of said insulator, said bracket having means for clamping the end of an inductance coil, and an inductance coil mounted on said clamping means, said inductance coil having its axis lying at substantially right angles to the gaps between the electrodes.

17. In combination, a pair of parallel pipe members, a third pipe member secured to one of said parallel pipe members and extending substantially at right angles to said pair of parallel members, a clamp mounted on said pair of members substantially at the junction of said laterally extending pipe member, with said pair of pipe members, a second clamp secured to said parallel pipe members a short distance away from the first clamp, a third clamp secured to said laterally extending pipe member a short distance away from the first clamp, said clamps each having substantially flat upper faces, petticoated insulators mounted on each of said flat faces, insulator clamps for securing the petticoated insulators with the bottom petticoats substantially flat upon said flat faces, clamps for the heads of the insulators, brackets on said head clamps, electrodes connected to the brackets of the first and second insulators to form a horn gap between them, clamping means on the brackets of the first and third insulators for supporting an inductance coil between them, a line connection leading from the bracket of the first insulator and a ground connection leading from the bracket of the second insulator.

In witness whereof, I hereunto subscribe my name this 20th day of May, A. D. 1918.

ERNEST H. JACOBS.